(No Model.)

G. JONES.
DRAFT EQUALIZER.

No. 500,808. Patented July 4, 1893.

Witnesses:—
A. O. Babendreier.
A. Macauley.

Inventor:—
Griffith Jones
By Chas. B. Mann
Attorney.

UNITED STATES PATENT OFFICE.

GRIFFITH JONES, OF BALTIMORE, MARYLAND.

DRAFT-EQUALIZER.

SPECIFICATION forming part of Letters Patent No. 500,808, dated July 4, 1893.

Application filed April 14, 1893. Serial No. 470,298. (No model.)

*To all whom it may concern:*

Be it known that I, GRIFFITH JONES, a citizen of the United States, residing at Baltimore, in the State of Maryland, have invented certain new and useful Improvements in Draft-Equalizers, of which the following is a specification.

This invention relates to an improvement in draft equalizers, and has for its object to provide a simple harness by means of which when two animals are hitched together, each shall have to bear an equal share of the pulling strain.

Figure 1:
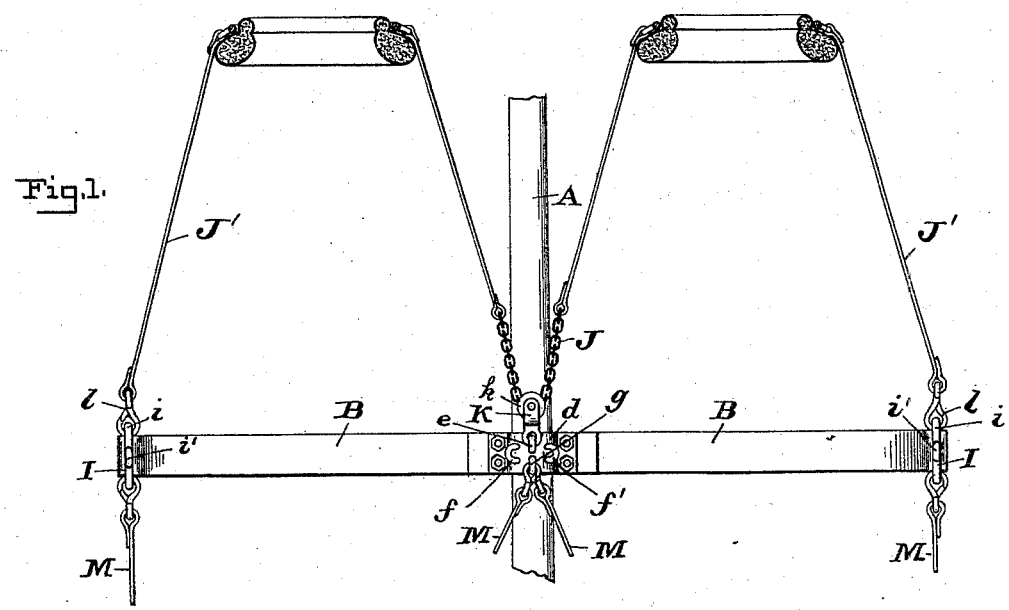
Figure 2:
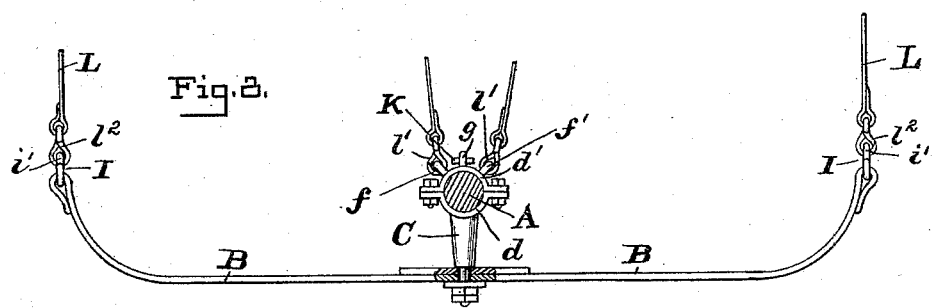
Figure 3:
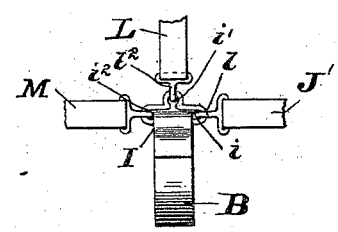

In the accompanying drawings, Figure 1 is a top plan view of a vehicle pole with the draft-bar and harness secured thereto. Fig. 2, is an elevation, showing the pole in cross-section. Fig. 3, is a detail view of one of the triple-loop links with which each end of the draft-bar is provided.

Referring to the drawings the letter, A, indicates the pole: B, the draft-bar pivoted to the pole; C, a pendent post secured to the pole and to the lower end of which the said draft-bar is pivoted and at the upper end of which one half, $d$, of a split-collar is secured, the other half, $d'$, of the split-collar is on the upper side of the pole. This split-collar is bolted together around the pole at a desired point and fastens the draft-bar to the pole. Secured to the upper section, $d'$, of the split-collar are four eyelets or loops, respectively, $e, f f', g$. Two of these eyelets, $e$, and, $g$, are disposed one in front of the other, longitudinally of the pole. The other two, $f, f'$, are disposed transversely in the direction of the draft-bar.

In use the draft-bar is under the animals and between their fore and hind legs. As shown in the drawings, the ends of the draft-bar are curved upward, and each end has a triple loop-link, I, to which various parts of the harness are secured as will be presently described.

The drawings represents certain parts for a set of double harness in which an equalizing tug for the two animals is formed of a single piece, here shown as a chain, J. A pulley block, K, bearing a pulley, $k$, is secured to the front eye, $e$, on the pole and the said equalizing tug passes through the pulley-block and around the pulley and its ends are secured to the hames on the collar in the usual manner, one end of course being secured to the hame on the collar of one animal and the other end to that on the other animal. Thus this tug is common to the harness of both animals. The other tug, J', for the harness of each animal, has a snap-hook, $l$, to engage one of the loops, $i$, of the triple-link, I.

The back bands, L, which are to be attached in the usual manner to the harness saddle, are secured by snap-hooks, $l'$, to the eyelets, $f$, and, $f'$, on the pole, A, and by snap-hooks, $l^2$, to the loops, $i'$, of the triple links.

There is a separate hold-back-strap or breeching M, for each of the animals, and each breeching is secured at one end to the rear eye, $g$, on the pole, and at the other end to one of the loops, $i^2$, of the triple-loop-links, I, on the end of the draft-bar.

The virtue of the device as a draft equalizer lies in the pivoted draft-bar in co-operation with the equalizing tug movable on the pulley, $k$. If one of the two draft-animals be disposed to lag, the other, exerting more force will forge ahead, drawing his end of the pivoted draft-bar with him, consequently forcing that end of the laggard horse back and the equalizing tug will slide on the pulley, $k$.

Having thus described my invention, I claim as new and desire to secure by Letters Patent—

1. In a draft-equalizer for two animals, the combination of the vehicle pole; a draft-bar pivoted to the pole; a pulley also secured to the pole; an equalizing tug passing over the said pulley, and connected with the harness of both animals; two hold-backs each secured at one end to an opposite end of the draft-bar and at the other end to a loop on the vehicle pole; and two back-straps also each secured at one end to an opposite end of the draft-bar and at the other end to a loop on the pole.

2. In a draft-equalizer the combination of the vehicle-pole; a collar secured to the pole; eyelets or loops secured to the collar; a pulley also secured to the collar; a downwardly projecting post secured to the collar; a draft-bar pivoted to said post; two back-bands and two hold-backs each secured at one end to the collar and at the other end to one end of the draft-bar; and an equalizing tug passing through the said pulley and connected with the harness of both animals as set forth.

In testimony whereof I affix my signature in the presence of two witnesses.

GRIFFITH JONES.

Witnesses:
CHAS. B. MANN, Jr.,
ARTHUR O. BABENDREIER.